United States Patent
Takeuchi

(10) Patent No.: US 7,229,212 B2
(45) Date of Patent: Jun. 12, 2007

(54) BALL LINEAR GUIDE AND MANUFACTURING METHOD THEREOF

(75) Inventor: Mitsuo Takeuchi, Iwaki (JP)

(73) Assignee: Takeuchi Precision Works Co., Ltd., Fukushima (JP)

(*) Notice: Subject to any disclaimer, the term of this patent is extended or adjusted under 35 U.S.C. 154(b) by 632 days.

(21) Appl. No.: 10/687,669

(22) Filed: Oct. 20, 2003

(65) Prior Publication Data
US 2004/0085007 A1   May 6, 2004

(30) Foreign Application Priority Data
Oct. 22, 2002   (JP) .............................. 2002-343052

(51) Int. Cl.
F16C 29/06   (2006.01)
(52) U.S. Cl. .......................... 384/45; 384/43
(58) Field of Classification Search .................. 384/43, 384/45
See application file for complete search history.

(56) References Cited

U.S. PATENT DOCUMENTS 4,869,600 A * 9/1989 Tonogai ........................ 384/43
5,082,374 A * 1/1992 Narumiya ..................... 384/45

FOREIGN PATENT DOCUMENTS

| EP | 0 769 627 A1 | 4/1997 |
|---|---|---|
| EP | 0 838 602 A1 | 4/1998 |
| EP | 1 110 005 A0 | 3/2000 |
| JP | 61-85716 | 6/1986 |
| JP | 63-158319 | 7/1988 |
| JP | 03-292412 | 12/1991 |
| JP | 07-103230 | 4/1995 |
| JP | 10-037955 | 2/1998 |
| JP | 1998-0008435 | 4/1998 |

* cited by examiner

Primary Examiner—William C. Joyce
(74) Attorney, Agent, or Firm—Antonelli, Terry, Stout & Kraus, LLP.

(57) ABSTRACT

A metallic flat plate base of a metallic component of a ball linear guide includes a pair of plate portions integrally connected with each other through a first flat plate portion and being formed with dovetail grooves which constitute loaded ball grooves. A first synthetic resin component is disposed so as to cover the flat plate, the first synthetic resin component having one sides which connect to a third flat plate portion to form slits, also having a pair of unloaded ball holes, and further having grooves for forming direction changing U-shaped passages which connect the loaded ball grooves and the unloaded ball holes. A pair of second synthetic resin components is mounted on the first synthetic resin component and closes the unloaded ball holes and the direction changing U-shaped passages, the pair of second synthetic resin components having other sides for forming the slits.

8 Claims, 6 Drawing Sheets

BALL LINEAR GUIDE AND MANUFACTURING METHOD THEREOF

BACKGROUND OF THE INVENTION

The present invention relates to a ball linear guide and a method of manufacturing the same.

The ball linear guide is often used for X, Y, and Z axes in machine tools such as numerically controlled (NC) machines, also in other working machines, automatic welders, injection molding machines, automatic conveyance apparatuses, industrial robots, and further in slide portions of general industrial machines.

The ball linear guide is constructed in such a manner that balls circulate continuously through a ball circulation path formed annularly. FIGS. 5A to 5E show a structural example of a conventional ball linear guide, in which FIG. 5A is a top view, FIG. 5B and FIG. 5C are side views in different directions, FIG. 5D is a sectional view taken on line B—B in FIG. 5B, and FIG. 5E is a sectional view (LM (Linear Motion) block end face) taken on line A—A in FIG. 5A.

In these figures, the numeral 51 denotes an LM block (slider) which constitutes a bearing body mounted on a rail, numerals 52 and 53 denote end plates (ball direction changing parts) attached to both ends of the LM block 51 and serving as return U groove ball holders, numerals 54 and 55 denote round pieces (ball direction changing parts) inserted between the LM block 51 and the end plates 52, 53, numeral 56 denotes a mounting screw for mounting the round pieces 54, 55 and the end plates 52, 53 to the LM block 1, numeral 57 denotes a loaded ball groove constituted by a dovetail groove which is formed on a side face opposed to a slide surface of the rail of the LM block 51, numeral 58 denotes an unloaded ball hole formed on the side opposite to the slide surface of the track base of the LM block 51, numeral 59 denotes a ball guiding semicircular portion formed in the round pieces 54 and 55, numeral 60 denotes a direction changing U groove formed in each of the end plates 52 and 53, numeral 61 denotes a ball, numeral 62 denotes a mounting and positioning hole, numeral 63 denotes an end plate/round piece mounting tapped hole, and numeral 64 denotes a tapped hole for mounting the block 51 to a machine or apparatus.

In this conventional ball linear guide, the balls 61 move as loaded balls through the loaded ball groove 57, then, as unloaded balls, change their direction 180° in the direction changing U groove 60 formed in the end plate 52, then move through the unloaded ball hole 58, thereafter again change their direction 180° in the direction changing U groove 60 formed in the end plate 53, and thereafter again return as loaded balls into the loaded ball grooves 57.

Thus, the ball circulation path which comprises the loaded ball groove 57, the unloaded ball groove 58 and the direction changing U groove 60 is in the shape of a field track, in which the portion of the loaded ball groove 57 is easy to be machined from the exterior, but the unloaded ball hole 58 and the direction changing U groove 60 are difficult to be machined from the exterior. Therefore, the end plates 52 and 53 in each of which is formed the LM block 51 with the loaded ball groove 57 and the unloaded ball hole 58 as a linear hole formed therein, and the round pieces 54 and 55 which form the direction changing U groove 60, are fabricated separately and are then combined together to produce a ball linear guide.

Generally, the LM block 51 is constituted by a metallic block, and as the end plates 52 and 53 there are used resinous end plates each formed with a semicircular ball passage.

More specifically, in an assembling work, the end plates 52 and 53 having semicircular ball passages are fixed with mounting bolts 56 to both ends of the LM block 51 formed with linear ball. This assembling work is performed through the round pieces (ball guide plates) 54 and 55 made of a synthetic resin at both ends of the LM block 51.

Since this ball linear guide is constituted by a combination of LM block 51, round pieces 54, 55, and end plates 52, 53, division lines are present among them, so in joint portions between the LM block 51 and the end plates 52, 53 there exist chamfered structures based on the difference in height which is caused by joint of the ball passages, i.e., the difference in height between the LM block 51 and the end plates 52, 53. Consequently, there occurs a case where the movement of balls is not always smooth. In this case, a smooth rotation of balls is not obtained, so that it is impossible to effect a high-speed rotation of balls and a loud vibration noise is generated.

Moreover, in point of fabrication, the number of parts is large because of a divided structure, and hence the number of machining steps for the end plates, bolt mounting taps and holes is large and a work for mating bolts and parts is necessary. Thus, the number of working steps is large and close attention is needed for the assembly.

In particular, without the rail, the balls positioned within each of the loaded ball grooves cannot be held within the dovetail groove and fall off from the loaded ball groove. In such a case, handling of the balls is not easy. A technique for preventing this inconvenience has been proposed. According to this proposal, a linear member for preventing the drop of balls is disposed on a front side of the dovetail groove to prevent drop of the balls even when the ball linear guide is pulled out from the rail (see, for example, a known literature 1 (Japanese Unexamined Utility Model Publication No. 137417/1984 (page 1, FIG. 1))).

FIGS. 6A to 6B are explanatory diagrams showing the structure of the proposed technique, in which FIG. 6A is a sectional plan view and FIG. 6B is a sectional view of a principal portion. In the same figure, the same portions as in FIGS. 5A to 5E are identified by the same reference numerals. This structure is different from the structure of FIG. 5 in that a ball dislodgment preventing member 65 constituted by a line of a circular or square section is attached to the front side of the loaded ball groove 57, whereby it is possible to prevent dislodgment of the balls 61 in the aforesaid case.

SUMMARY OF THE INVENTION

As described above, since the conventional ball linear guide is of a construction wherein the LM block, round pieces, and end plates are combined together, the number of parts is large and it is impossible to attain the reduction of cost. More particularly, screw machining and drilling of positioning holes are required in the mounting of parts, so it is impossible to reduce the number of working steps and the assembling work is not easy. Further, in the case where the portion of the unloaded ball hole (ball return hole) 65 is formed of metal, a loud noise is generated by collision thereof with the balls 51 (metal).

In particular, if the ball dislodgment preventing member 65 is provided to prevent the balls 61 from falling off when the LM block 51 is pulled out from a rail 66, the number of parts increases and hence it has so far been impossible to reduce the number of assembling steps.

In the method wherein the ball dislodgment preventing member 65 is installed on the front side of the loaded ball row, it is necessary to use a structure for fixing such a structural member as a circular or square linear member to the front side of the ball row. In this case, also on the sliding side, i.e., on the rail 66 side, it is necessary to form a recess 67 for passage of the linear member 65, so that the number of working steps is large and it has been impossible to reduce the number of working steps.

It is an object of the present invention to provide a ball linear guide having a ball dislodgment preventing function at the time of pulling out the LM block from the rail, simple in structure, and permitting reduction in the number of working steps and permitting easy manufacture.

It is another object of the present invention to provide a ball linear guide of a light weight and capable of suppressing noise.

The ball linear guide provided according to the present invention for achieving the above-mentioned objects is constructed like the following (A), (B), (C), (D), (E), or (F).

(A) A ball linear guide having ball circulation paths formed on both sides opposed to slide surfaces of the rail, the ball circulation paths being each formed by a loaded ball groove, an unloaded ball hole, and direction changing U-shaped passages which connect the loaded ball groove and the unloaded ball hole with each other, the ball linear guide comprising:

a metallic component (1) comprising a metallic flat plate base (10), the metallic flat plate base (10) being formed by erecting thereon a pair of plate portions (11, 12) and connecting the pair of plate portions (11, 12) integrally with each other through a first flat plate portion (13), the pair of plate portions (11, 12) being respectively formed with dovetail grooves (4') which respectively constitute loaded ball grooves (4) substantially throughout the overall lengths of side faces opposed to the slide surfaces;

a first synthetic resin component (2) disposed so as to cover the flat plate base (10) in an inserted state of the pair of plate portions (11, 12) into the first synthetic resin component (2), the first synthetic resin component (2) having one sides (24) which, on the first flat plate portion side in the loaded ball grooves (4), connect to a third flat plate portion positioned on a front side of the first flat plate portion to form slits, also having a pair of unloaded ball holes (6) formed on the side opposite to the side where the dovetail grooves of the plate portions are formed, and further having grooves (7) for forming direction changing U-shaped passages which connect the loaded ball grooves (4) and the unloaded ball holes (6) with each other at both ends; and a pair of second synthetic resin components (31, 32) mounted on the first synthetic resin component (2) and closing the unloaded ball holes and the direction changing U-shaped passages formed in the first synthetic resin component, the pair of second synthetic resin components (31, 32) having other sides (34) for forming the slits, wherein the dislodgment of balls from the loaded ball grooves (4) is prevented by the one sides (24) which form the slits in the first synthetic resin component (2) and the other sides (34) which form the slits in the second synthetic resin components (31, 32).

(B) In (A), the pair of plate portions (11, 12) of the metallic component (1) are inserted respectively into a pair of slots formed in the first synthetic resin component (2) to mount and fix the first synthetic resin component (2) to the metallic component (1).

(C) In (A), the metallic component (1) is subjected to insert resin molding to fix the first synthetic resin component (2) to the metallic component (1).

(D) In (A) or (B) or (C), in the first synthetic resin component (2), rake portions (25) for the balls are formed contiguously to both ends of each of the one sides (24) which form the slits.

(E) In (A) or (B) or (C) or (D), the unloaded ball holes and the grooves of the direction changing U-shaped passages in the first synthetic resin component (2) are formed in such a manner that in each of their sectional shapes a bottom portion is semicircular and the depth is almost equal to or larger than the diameter of each of the balls.

(F) In (A) or (B) or (C) or (D), each of the paired second synthetic resin components is mounted removably onto the first synthetic resin component.

(G) In (A) or (B) or (C) or (D), the spacing of the ball dislodgment preventing slits formed by free ends of the first and second synthetic resin components is a little smaller than the diameter of each of the balls.

(H) In (A) or (B) or (C) or (D), the thickness of each of the paired plate portions (11, 12) in the metallic component (1) is equal to or larger than the diameter of each of the balls.

The ball linear guide manufacturing method according to the present invention comprises the following method (I), (J), or (K).

(I) A method of manufacturing a ball linear guide having ball circulation paths formed on both sides opposed to slide surfaces of a rail, the ball circulation paths being each formed by a loaded ball groove, an unloaded ball hole, and direction changing U-shaped passages which connect the loaded ball groove and the unloaded ball hole with each other, the method comprising:

a first step of fabricating a metallic component (1) and a first synthetic resin component (2) separately, the metallic component (1) comprising a metallic flat plate base (10), the metallic flat plate base (10) being formed by erecting thereon a pair of plate portions (11, 12) and connecting the pair of plate portions (11, 12) integrally with each other through a first flat plate portion (13), the pair of plate portions (11, 12) being respectively formed with dovetail grooves (4') which respectively constitute loaded ball grooves (4) substantially throughout the overall lengths of side faces opposed to the slide surfaces, the first synthetic resin component (2) having one sides (24) which, on the first flat plate portion side in the loaded ball grooves (4), connect to a third flat plate portion positioned on a front side of the first flat plate portion to form slits, also having a pair of unloaded ball holes (6) formed on the side opposite to the side where the dovetail grooves of the plate portions are formed, and further having grooves (7) for forming direction changing U-shaped passages which connect the loaded ball grooves (4) and the unloaded ball holes (6) with each other at both ends;

a second step of inserting the pair of plate portions (11, 12) of the metallic component (1) respectively into a pair of slots formed in the first synthetic resin component (2) which components (1) and (2) have been fabricated separately in the first step, to mount and fix the first synthetic resin component (2) so as to cover the flat plate base (10) of the metallic component (1);

a third step of inserting balls into a ball circulation path formed in the second step; and a fourth step of, after the third step, closing the unloaded ball holes and the direction changing U-shaped passages formed in the first synthetic resin component and mounting a pair of second synthetic resin components (31, 32) onto the first synthetic resin component (2), the second synthetic resin components (31, 32) having other sides (34) for forming the slits.

(J) A method of manufacturing a ball linear guide having ball circulation paths formed on both sides opposed to slide surfaces of a rail, the ball circulation paths being each formed by a loaded ball groove, an unloaded ball hole, and direction changing U-shaped passages which connect the loaded ball groove and the unloaded ball hole with each other, the method comprising:

a fifth step of fabricating a metallic component (1) comprising a metallic flat plate base (10), the metallic flat plate base (10) being formed by erecting thereon a pair of plate portions (11, 12) and connecting the pair of plate portions (11, 12) integrally with each other through a first flat plate portion (13), the pair of plate portions (11, 12) being respectively formed with dovetail grooves (4') which respectively constitute loaded ball grooves (4) substantially throughout the overall lengths of side faces opposed to the slide surfaces; and a sixth step of subjecting the metallic component (1) fabricated in the fifth step to insert resin molding to form a first synthetic resin component (2) so as to cover the flat plate base (10) in an inserted state of the pair of plate portions (11, 12) respectively into slots formed in the first synthetic resin component (2), to fix the metallic component (1), the first synthetic resin component (2) having one sides (24) which, on the first flat plate portion side in the loaded ball grooves (4), connect to a third flat plate portion positioned on a front side of the first flat plate portion to form slits, also having a pair of unloaded ball holes (6) formed on the side opposite to the side where the dovetail grooves of the plate portions are formed, and further having grooves (7) for forming direction changing U-shaped passages which connect the loaded ball grooves (4) and the unloaded ball holes (6) with each other at both ends;

a seventh step of inserting balls into the ball circulation paths formed in the sixth step; and an eighth step of, after the seventh step, closing the unloaded ball holes and the direction changing U-shaped passages formed in the first synthetic resin component and mounting a pair of second synthetic resin components (31, 32) onto the first synthetic resin component (2), the second synthetic resin components (31, 32) having other sides (34) for forming the slits.

(K) In the first step in (I) or in the sixth step in (J), rake portions for the balls are formed contiguously to both ends of each of the one sides (24) which form the slits in the first synthetic resin component.

(L) In (I) or (J), the spacing of the ball dislodgment preventing slits formed by free ends of the first and second synthetic resin components is a little smaller than the diameter of each of the balls.

According to the present invention, as set forth above, a ball linear guide having a ball dislodgment preventing function to prevent balls from falling off upon pulling out the LM block from the rail can be manufactured easily in a simple structure and in a reduced number of working steps, thus bringing about an industrially outstanding effect.

According to the present invention, moreover, there can be realized a ball linear guide of a light weight and capable of diminishing noise.

DETAILED DESCRIPTION OF THE PREFERRED EMBODIMENTS

A ball linear guide and a method of manufacturing the same according to an embodiment of the present invention will be described hereinunder with reference to the drawings.

Figure 1:
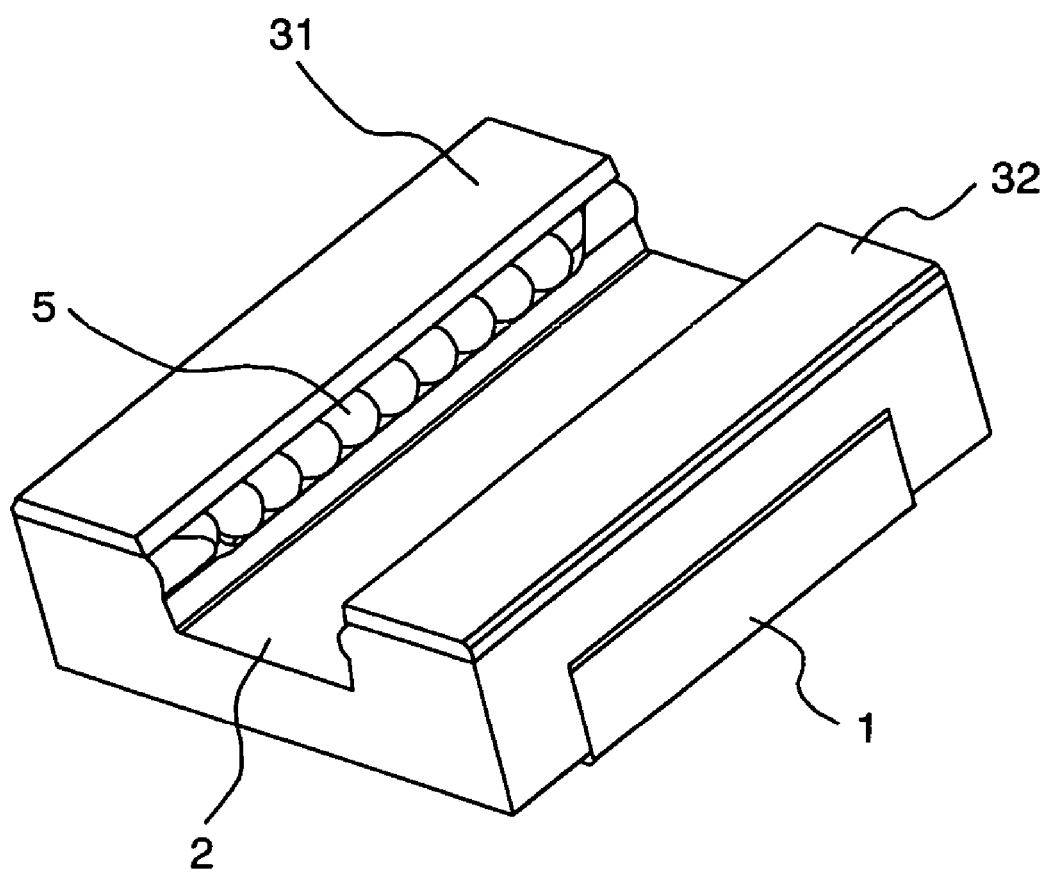
FIG. 1 is a perspective view showing a ball linear guide according to an embodiment of the present invention.
Figure 2C:
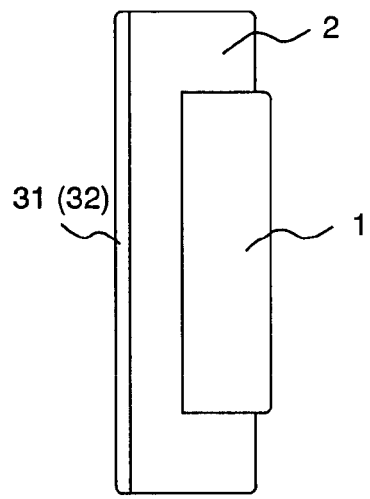
FIGS. 2A to 2C are explanatory diagrams thereof.
Figure 2A:
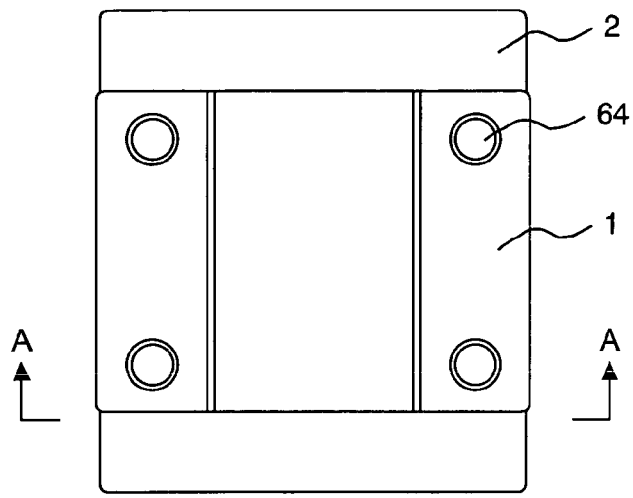
Figure 2B:
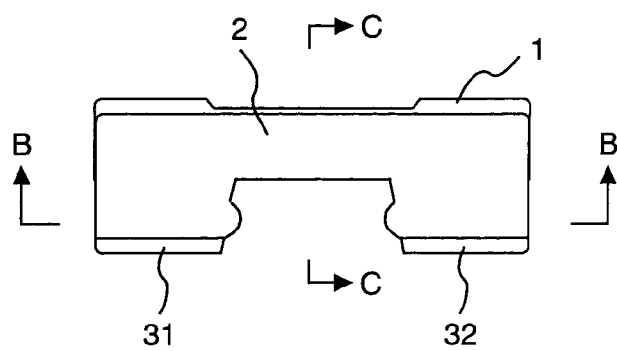
Figure 3A:
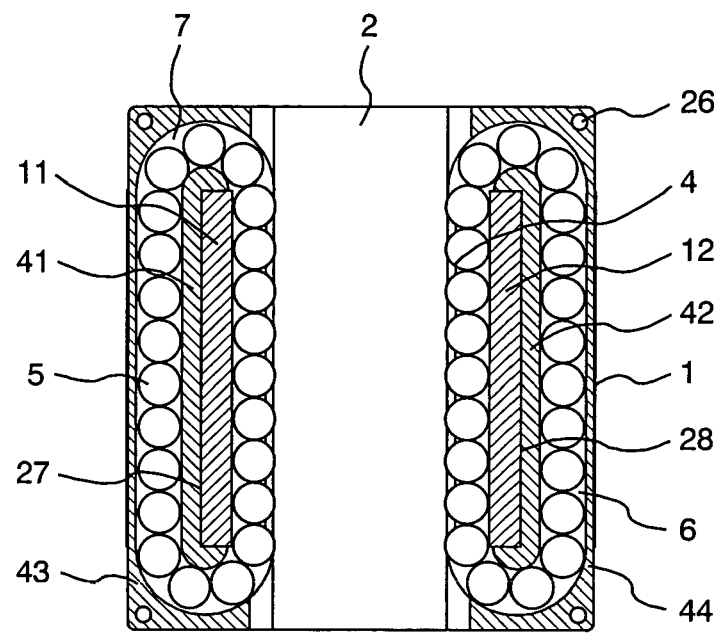
FIGS. 3A to 3C are explanatory diagrams of a principal portion thereof.
Figure 3B:
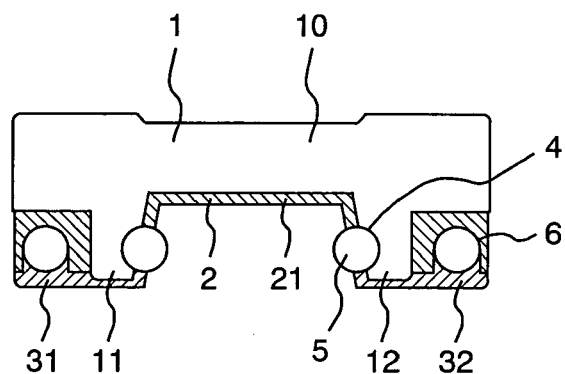
Figure 3C:
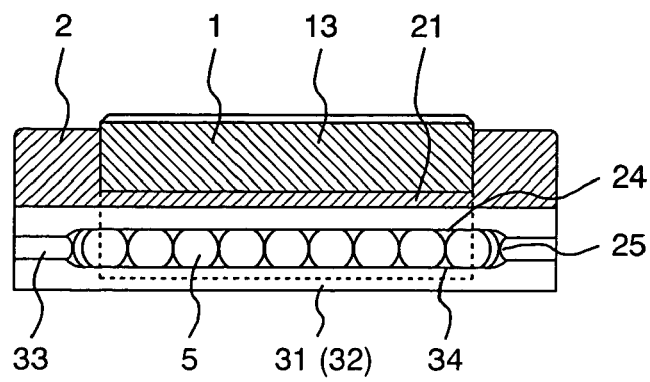

FIG. 1 is a perspective view of a ball linear guide according to an embodiment of the present invention. FIGS. 2A to 2C illustrates an appearance of the ball linear guide, in which FIG. 2A is a plan view, FIG. 2B is a front view, and FIG. 2C is a side view. FIGS. 3A to 3C are explanatory diagrams of a principal portion of the ball linear guide, in which FIG. 3A is a sectional view taken on line B—B in FIG. 2B, 3B is a sectional view (end view of LM block) taken on line A—A in FIGS. 2A, and 3C is a sectional view taken on line C—C in FIG. 2B. FIGS. 4A to 4D are exploded perspective views of the ball linear guide, in which FIGS. 4A, 4B, 4C, and 4D are perspective views of components (plates B31, 32, balls 5, plate A2, LM (Linear Motion) block 1).

In these figures, a metallic LM block (metallic component) 1 has a function as a slider which constitutes a bearing body placed on a rail. A plate A (first synthetic resin component) 2 has a pair of plate portions 11 and 12 which are erected so as to be opposed to each other on a flat plate base 10 of the LM block (metallic component) 1. The plate A2 is fixed to the LM block 1 by inserting the plate portions 11 and 12 into slots formed in the plate A2 and by using an adhesive or by insert resin molding. In the plate A2 there are formed loaded ball grooves 4, unloaded ball holes (ball return holes) 6, and grooves 7 of direction changing U-shaped passages which connect the loaded ball grooves 4 and the unloaded ball holes 6 with each other. These grooves and holes constitute a part of ball holders. The plates B (second synthetic resin components) 31 and 32 are attached to the plate A2 with an adhesive or by fitting and act as ball direction changing parts which constitute a part of the unloaded ball holes 6 and a part of the grooves 7 of direction changing U-shaped passages. The numeral 5 denotes a ball. The loaded ball grooves 4 and the unloaded ball holes 6 correspond to 57 and 58, respectively, in FIG. 5. As the ball 5 there is used, as an example, a steel ball having a diameter of about 2.5 mm.

The ball linear guide of this embodiment is composed of the LM block 1, the plate A2, and the plates B31 and 32, the details of which will be described below.

Figure 4A:
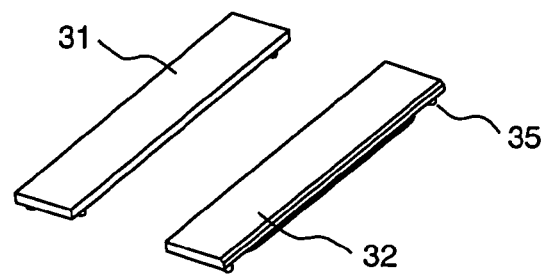
FIGS. 4A to 4D are exploded perspective views thereof.
Figure 4B:
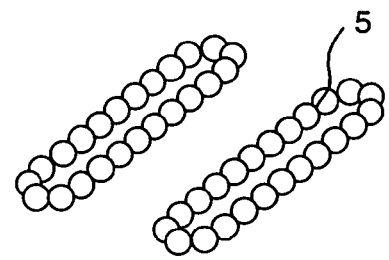
Figure 4C:
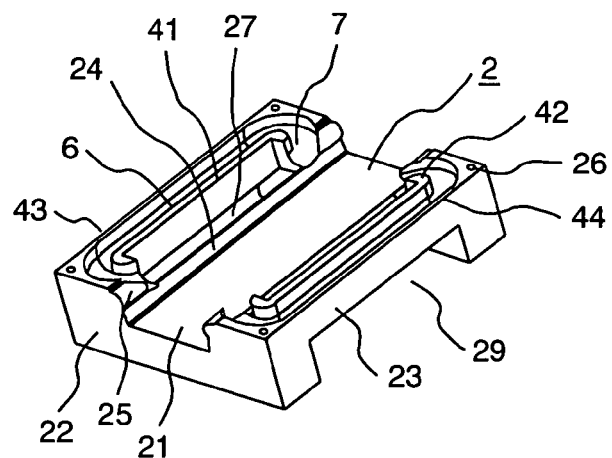
Figure 4D:
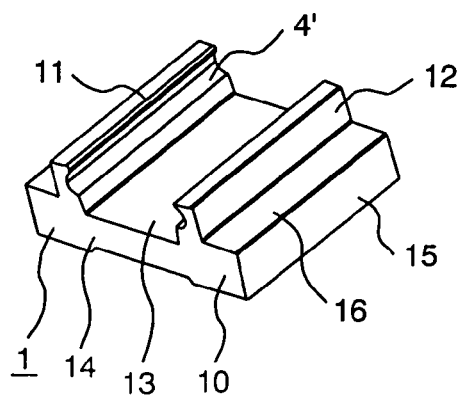
Figure 5A:
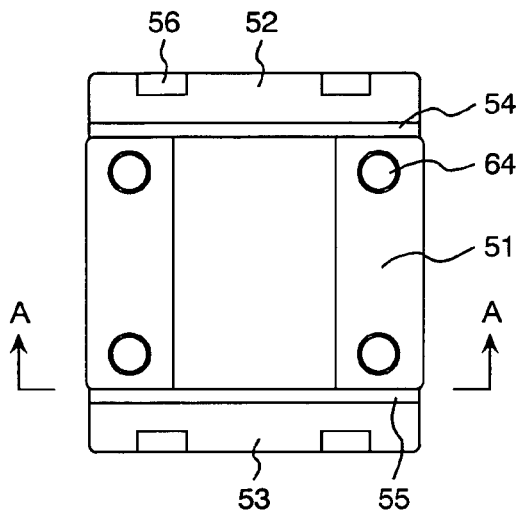
FIGS. 5A to 5E are explanatory diagrams showing an example of a conventional ball linear guide.
Figure 5B:
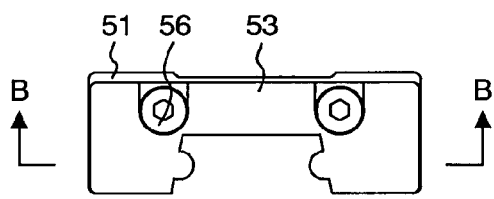
Figure 5C:
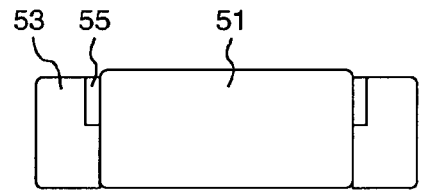
Figure 5D:
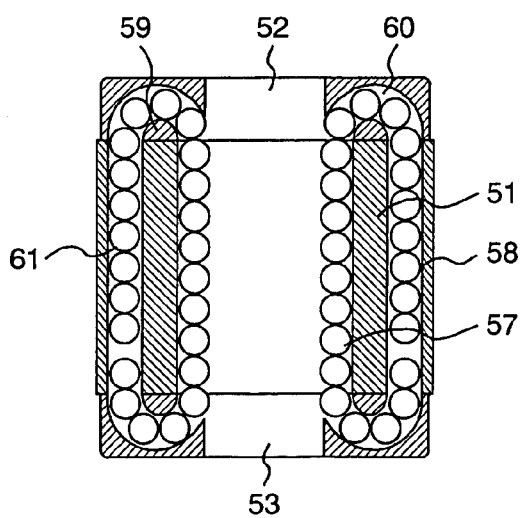
Figure 5E:
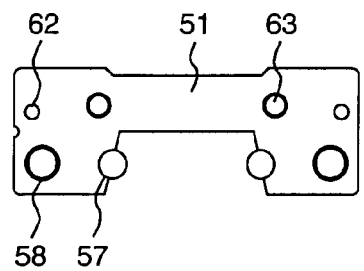
Figure 6A:
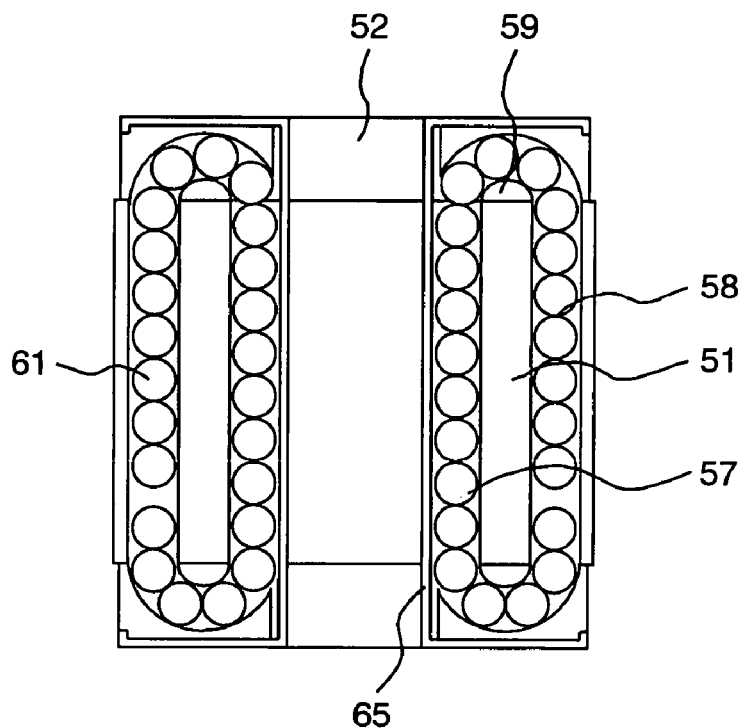
FIGS. 6A to 6B are explanatory diagrams showing another example of a conventional ball linear guide.
Figure 6B:
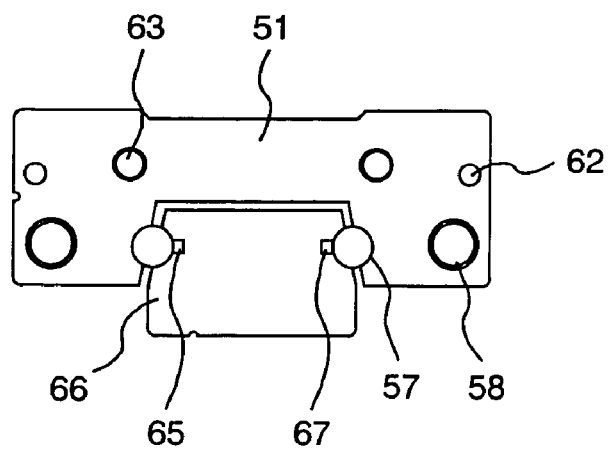

In the LM block 1, as shown in FIG. 4D, a pair of plate portions 11 and 12 are erected in a mutually opposed state on the surface of a flat plate base 10 which is constituted by a plate-like block. The LM block 1 is centrally provided with a first flat plate portion 13 which is depressed so as to permit a rail 66 to get therein in a moving direction of the LM block 1. Dovetail grooves 4' which constitute loaded ball grooves 4 are formed in the plate portions 11 and 12 in parallel with the moving direction of the LM block 1. The dovetail grooves 4' are positioned inside free end sides (close to tips) of the plate portions 11 and 12 and extend throughout the overall lengths of the mutually opposed sides. Outside the pair of plate portions 11 and 12 of the flat plate base 10 there are formed second flat plate portions 16 which are thicker than the first flat plate portion 13. In the second flat plate portions 16 are formed tapped holes 64 for mounting the LM block to a molding die or a jig at the time of manufacturing the ball linear guide (for example at the time of fabricating the plate A (first synthetic resin component) 2 by insert resin molding of the LM block 1). For example, the LM block 1 is formed of a metal such as hardened steel having an HRC of 60 or more, and the thickness of each of the plate portions 11 and 12 is about 3 mm which is equal to or larger than the diameter of each of the balls 5. Indicated at 14 are both end faces of the flat plate base 10 in the moving direction which also serve as both end faces of the pair of plate portions 11 and 12, while indicated at 15 are both end faces of the flat plate base 10 in a direction perpendicular to the moving direction.

As shown in FIG. 3A, slots 27 and 28 for insertion therein of the paired plate portions 11 and 12 of the LM block 1 are formed in the plate A2, and as shown in FIG. 4C, a recess 29 for insertion therein of the flat plate base 10 of the LM block 1 is formed in the plate A2. Thus, the portion, indicated at 23, where the recess 29 is formed is formed thin relative to the LM block side, and portions 22 located on both sides of the portion 23 are formed thick (convexly) relative to the LM block side in such a state as covers both end faces 14 of the flat plate base 10. That is, the plate A2 is fitted and fixed onto the LM block 1 by bonding or by insert resin molding so as to cover the flat plate portions 13, 16 and both end faces 14 of the LM block 1. Further, as shown in FIG. 3A, inner wall portions 41 and 42 are implanted in the plate A2 which, in an inserted state of the pair of plate portions 11 and 12, are positioned behind the plate portions 11 and 12 to form inner walls of the unloaded ball holes and the U-shaped passages. Likewise, outer wall portions 43 and 44 which form outer walls of the unloaded ball holes and the U-shaped passages are implanted in the plate A2. Thus, the unloaded ball holes 6 and the grooves 7 of U-shaped passages are formed by the inner wall portions 41, 42 and the outer wall portions 43, 44. A ball circulation path is formed by the loaded ball grooves 4, unloaded ball holes 6 and U-shaped passages 7 which are defined by fitting the plate A2 onto the LM block 1.

Further, the plate A2 is formed with a thin-walled, third plane portion 21 which is for forming one sides 24 (see FIG. 3C) of slits inside the loaded ball grooves 4, the slits functioning to prevent dislodgment of the balls 5 from the dovetail grooves 4' which constitute the loaded ball grooves 4. By thus positioning the thin-walled, third plane portion 21 in front of the firs plane portion 13 of the LM block 1, it becomes possible for the one sides 24 of the slits to be connected to the third plane portion 21 and formed inside the loaded ball grooves 4.

For example, the plate A (first synthetic resin component) 2 is formed of a polyacetal containing 10% of C, ABS resin containing carbon, or a plastic material containing Mo.

As shown in FIG. 4A, with the balls 5 inserted into the ball circulation path, the plates B31 and 32 are mounted (fitted) onto the plate A2 to close the open portion of the circulation path, whereby it is possible to form closed loaded ball grooves 4, unloaded ball holes 6 and direction changing U-shaped passages 7. When the plates B31 and 32 are mounted from above onto the plate A2 by bonding or by fitting, there are formed other sides 34 (see FIG. 3C) of the slits for preventing dislodgment of the balls 5 from the dovetail grooves 4' which constitute the loaded ball grooves 4. The plates B31 and 32 are respectively provided with concave portions of an arcuate section so that completely tunnel-like ball passages are formed when the plates B31 and 32 are united with the plate A2.

As the material of the plates B (second synthetic resin components) 31 and 32 there is used the same material as the material of the plate A2. The plate 32 has the same structure as the plate 31.

The mounting of the plates B31 and 32 to the plate A2 can be done not only by bonding but also by fitting, for example, by aligning and fitting notches 35 formed in the plates B31, 32 and holes 26 formed in the plate A2 with each other. It is optional which method is to be adopted insofar as the plates B31 and 32 can be mounted to the plate A2.

As described above, when the plates B31 and 32 are mounted to (combined with) the plate A2, the opposed sides 24 and 34 of slits for preventing dislodgment of the balls 5 are formed by free ends of both plates, further, ball guides (rakes) 25 (see FIG. 3C) for permitting smooth movement during movement of the balls 5 from the loaded ball grooves 4 to the unloaded ball holes 6 or vice versa are made integral with the plate A2 side, whereby it is possible to enhance the strength of the ball guides.

The ball guides (rakes) 25 are apt to be broken and undergo troubles, but by making one sides 24 of the ball holding slits and the ball guides 25 integral with each other it is possible to enhance the strength of the ball guides.

This ball linear guide is manufactured by the steps of fabricating the LM block 1, plate A2, and plates B31, 32 separately, then attaching and fixing the plate A2 to the LM block 1 by bonding etc., thereafter inserting the balls 5 into the ball circulation paths, and mounting the plates B31 and 32 to the plate A2. That is, the LM block 1, the plate A2, and the plates B31, 32 are fabricated by the ordinary manufacturing process. At the stage of making the plate A2 integral with the LM block 1 by bonding, the balls 5 are inserted and the plates B31 and 32 are fixed by bonding or fitting. Thus, the assembly of the plate A2 for the LM block 1 is usually carried out by bonding separately fabricated ones.

In the case where the plates B31 and 32 are fixed by fitting, the removal thereof is easy and therefore the change of balls can be done as necessary.

In this ball linear guide, moreover, the plate portions 11 and 12 of the LM block 1 are thin-walled, so when an impact load or the like is imposed on the ball linear guide, the load can be diminished by the resilience of the metallic portion.

Although in the above embodiment the ball linear guide is manufactured by using a separately molded plate as the plate A (first synthetic resin component) 2 to be combined with the LM block 1 (metallic component) and by combining it with the metallic component 1, there may be adopted a method wherein the plate A (first synthetic resin component) 2 is fixed to the LM block (metallic component) 1 by insert resin molding. Even in this case there can be obtained the same structure as above.

As described above, the ball linear guide of this embodiment has an integral structure wherein the ball dislodgment preventing mechanism prevents dislodgment of the balls when the LM block 1 is pulled out from the rail, thus permitting reduction in the number of assembling steps. Moreover, since this ball dislodgment preventing mechanism does not require the assembling of any other separate part, it is not necessary to use any special structure such as a linear body. Thus, the dislodgment of balls can be prevented simultaneously with formation of the unloaded ball holes and the direction changing U-shaped passages.

Moreover, this ball dislodgment preventing mechanism is integral with the unloaded ball holes, and its mounting is conducted by fitting and bonding without the need of assembling parts or tightening of screws, so that it is possible to reduce the number of such works as screw machining and drilling of positioning holes, and the assembling work becomes easier. Besides, the reduction of cost can be attained because of a smaller number of parts used. Further, since the unloaded ball holes are formed of a synthetic resin, it is possible to diminish a loud noise caused by collision of the holes with the balls (metal) which has been a problem in case of the unloaded ball holes being metallic holes, and it is possible to attain the reduction of weight. Additionally, under the application of an impact load or the like, it is possible to lighten the load.

What is claimed is:

1. A ball linear guide having ball circulation paths formed on both sides opposed to slide surfaces of a rail, the ball circulation paths being each formed by a loaded ball groove, an unloaded ball hole, and direction changing U-shaped passages which connect the loaded ball groove and the unloaded ball hole with each other, said ball linear guide comprising:

a metallic component comprising a metallic flat plate base, the metallic flat plate base being formed by erecting thereon a pair of plate portions and connecting the pair of plate portions integrally with each other through a first flat plate portion, the pair of plate portions being respectively formed with dovetail grooves which respectively constitute loaded ball grooves substantially throughout the overall lengths of side faces opposed to the slide surfaces;

a first synthetic resin component disposed so as to cover the flat plate base in an inserted state of the pair of plate portions into the first synthetic resin component, the first synthetic resin component having one sides which, on the first flat plate portion side in the loaded ball grooves, connect to a third flat plate portion positioned on a front side of the first flat plate portion to form slits, also having a pair of unloaded ball holes formed on the side opposite to the side where the dovetail grooves of the plate portions are formed, and further having grooves for forming direction changing U-shaped passages which connect the loaded ball grooves and the unloaded ball holes with each other at both ends; and a pair of second synthetic resin components mounted on the first synthetic resin component and closing the unloaded ball holes and the direction changing U-shaped passages formed in the first synthetic resin component, the pair of second synthetic resin components having other sides for forming the slits;

wherein the dislodgment of balls from the loaded ball grooves is prevented by the one sides which form the slits in the first synthetic resin component and the other sides which form the slits in the second synthetic resin components.

2. A ball linear guide according to claim 1, wherein said pair of plate portions of said metallic component are inserted respectively into a pair of slots formed in said first synthetic resin component to mount and fix the first synthetic resin component to the metallic component.

3. A ball linear guide according to claim 1, wherein, said metallic component is subjected to insert resin molding to fix said first synthetic resin component to the metallic component.

4. A ball linear guide according to claim 1, wherein, in said first synthetic resin component, rake portions for the balls are formed contiguously to both ends of each of said one sides which form said slits.

5. A ball linear guide according to claim 1, wherein said unloaded ball holes and said grooves of the direction changing U-shaped passages in said first synthetic resin component are formed in such a manner that in each of their sectional shapes a bottom portion is semicircular and the depth is almost equal to or larger than the diameter of each of the balls.

6. A ball linear guide according to claim 1, wherein each of said paired second synthetic resin components is mounted removably onto said first synthetic resin component.

7. A ball linear guide according to claim 1, wherein the spacing of said ball dislodgment preventing slits formed by free ends of said first and second synthetic resin components is a little smaller than the diameter of each of the balls.

8. A ball linear guide according to claim 1, wherein the thickness of each of said paired plate portions in said metallic component is equal to or larger than the diameter of each of the balls.

* * * * *